(12) United States Patent
Nambannor Kunnath et al.

(10) Patent No.: US 11,461,494 B2
(45) Date of Patent: Oct. 4, 2022

(54) SECURE VIEW OF CONTENT ON DEVICES

(71) Applicant: AIRWATCH LLC, Atlanta, GA (US)

(72) Inventors: Ramanandan Nambannor Kunnath, Bangalore (IN); Dan Zeck, Atlanta, GA (US); Ian Ragsdale, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 520 days.

(21) Appl. No.: 15/826,703

(22) Filed: Nov. 30, 2017

(65) Prior Publication Data
US 2019/0108200 A1    Apr. 11, 2019

(30) Foreign Application Priority Data
Oct. 6, 2017   (IN) .............................. 201741035503

(51) Int. Cl.
| | |
|---|---|
| *G09G 5/30* | (2006.01) |
| *G06F 21/84* | (2013.01) |
| *G06F 40/106* | (2020.01) |
| *G06F 40/109* | (2020.01) |
| *G06F 40/197* | (2020.01) |
| *G06F 40/143* | (2020.01) |
| *H04L 51/08* | (2022.01) |
| *G09G 5/26* | (2006.01) |
| *G06F 21/62* | (2013.01) |

(52) U.S. Cl.
CPC .......... *G06F 21/6245* (2013.01); *G06F 21/84* (2013.01); *G06F 40/106* (2020.01); *G06F 40/109* (2020.01); *G06F 40/143* (2020.01); *G06F 40/197* (2020.01); *G09G 5/30* (2013.01); *G09G 5/26* (2013.01); *G09G 2320/0666* (2013.01); *G09G 2320/0693* (2013.01); *G09G 2358/00* (2013.01); *H04L 51/08* (2013.01)

(58) Field of Classification Search
CPC ...................................................... G06F 17/21
USPC ...................................................... 715/229
See application file for complete search history.

(56) References Cited

U.S. PATENT DOCUMENTS

| | | | | |
|---|---|---|---|---|
| 2002/0113801 | A1* | 8/2002 | Reavy ...................... | G09G 5/02 345/589 |
| 2004/0193910 | A1* | 9/2004 | Moles ...................... | G06F 21/62 726/27 |
| 2017/0040002 | A1* | 2/2017 | Basson .................... | G09G 5/37 |

* cited by examiner

*Primary Examiner* — Andrew R Dyer
*Assistant Examiner* — Tionna M Burke
(74) *Attorney, Agent, or Firm* — Thomas Horstemeyer, LLP

(57) ABSTRACT

Various examples for providing for the secure view of content on devices are disclosed. In one example, a content modification service, such as an email modification service, can access a document from a server destined for a client device and generate a modified form of the document by adjusting a visual setting associated with a display of the content that affects an ability to view the content from an area beyond a predetermined range. The content modification service or a client application can selectively provide the document or the modified version of the document in a display of the client device based on a setting of the client device, a device profile, or compliance rules specified by an administrator of a management service.

20 Claims, 13 Drawing Sheets

SECURE VIEW OF CONTENT ON DEVICES

RELATED APPLICATIONS

Benefit is claimed under 35 U.S.C. 119(a)-(d) to Foreign Application Serial No. 201741035503 filed in India entitled "SECURE VIEW OF CONTENT ON DEVICES", on Oct. 6, 2017, by AIRWATCH LLC, which is herein incorporated in its entirety by reference for all purposes.

BACKGROUND

With the emergence of bring-your-own-device (BYOD) technology in the workplace, an enterprise can permit its employees to use their own phone and tablet devices to access enterprise data, such as email and corporate documents. Similarly, an enterprise can provide its employees with devices owned by the enterprise but taken home by the employees. Prior to an employee using his or her own device for work-related functions, the enterprise can require the employee to enroll with a management service capable of protecting enterprise data stored on a device from theft, data loss, and unauthorized access. Through an administrator console, administrators for the enterprise can oversee the operation of enrolled devices.

As work-related content can be accessed by an employee in various situations, typically enterprises desire precautions to prevent theft, data loss, and unauthorized access of enterprise data. However, those precautions may not prevent an ability of eavesdropper to view content shown on a display of a device. Computer display privacy screens can prevent eavesdroppers from content on a display; however, privacy screens are costly, bulky, and sometimes ineffective.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to the secure view of content on devices. Current displays permit those that aren't currently operating a device to also view content which prevents security risks when enterprise data and other sensitive content is being shown. For instance, if an employee of an enterprise is operating his or her device on an airplane, other passengers are able to view the content shown in the display. Privacy screens exist that can prevent eavesdroppers from viewing content shown on a display. However, privacy screens are costly, bulky, and sometimes ineffective, especially when an eavesdropper is close to a device.

The aforementioned limitations are addressed herein by implementing a programmatic approach to altering visual characteristics of a display. In one example, a computing environment can generate a modified form of a document destined for a client device by adjusting one or more visual settings associated with a display of the content that impacts an ability to view the email content from an area beyond a viewable range for an operator of the client device. The computing environment can also selectively provide the document or the modified version of the document for display on the client device based on, for example, a setting of the client device. The email content can include, for example, text, images, or other content.

In some examples, if the content includes text, the visual settings that can be adjusted by the computing environment include a background color of text, a font color of text, a font size of text, and a font style of text. For example, the computing environment can generate the modified form of the document by adjusting hypertext markup language (HTML) code associated with at least one of: the background color of the text, the font color of the text, the font size of the text, and the font style of the text. The computing environment can adjust the visual settings to have the font color of the text be within a color threshold of the background color of the text.

Figure 1:
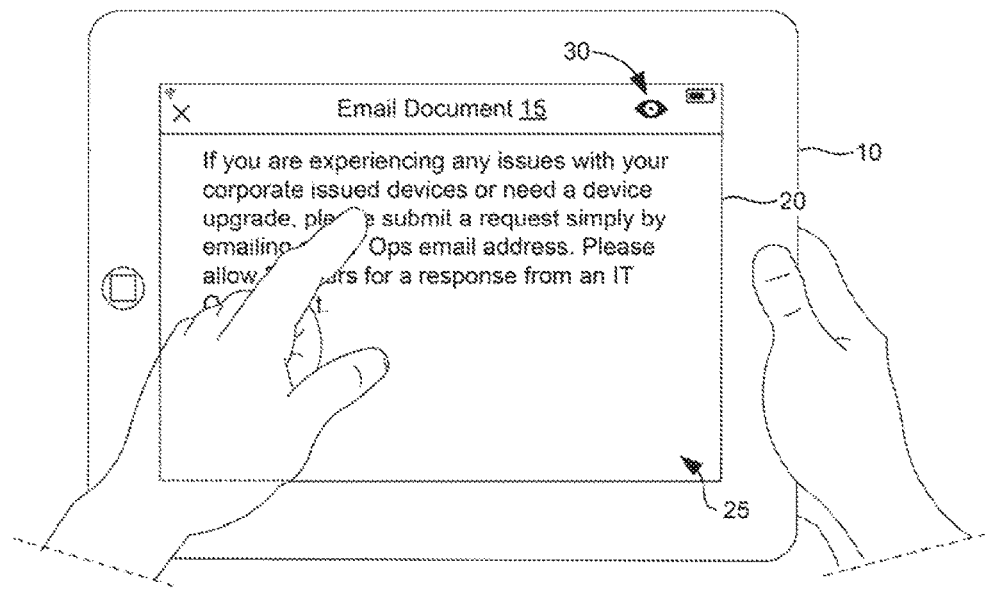
FIG. 1 is a drawing of a client device showing content in a display while operated by a user.

With reference to FIG. 1, a client device 10 is shown being held by a user or operator, where the client device 10 is operated by the user to read an email document 15 shown in a display 20 of the client device 10. For instance, a user can select an email application and navigate one or more user interfaces 25 to send or review email documents 15, access a calendar, or perform other tasks. As can be appreciated, content shown in the display, such as an email document 15, can include sensitive information. For instance, the email document 15 can include confidential data or usernames, passwords, or other information. It is understood that the user is typically within a certain range of the display 20 as the user operates the client device 10, referred to as an "operator range" or a "viewable range." Current displays 20, however, permit those not within the operator range to also view the content shown in a display 20. For instance, if the user is operating the client device 10 on an airplane, other passengers are able to view the content shown in the display 20.

Accordingly, in examples described herein, the content shown in the display 20 can be modified such that only a user within the operator range can perceive the content shown in the display 20. In some examples, the user can select or otherwise manipulate a secure view icon 30 to toggle the client device 10 between a secure mode of operation and a non-secure mode of operation, where the secure mode of operation can include the content shown in the display being modified such that only a single user within the operator range can perceive the content shown in the display 20. Those outside of the operator range will find it difficult or impossible to perceive the content shown in the display 20. The non-secure mode of operation can include the content shown in the display without modification.

Figure 2:
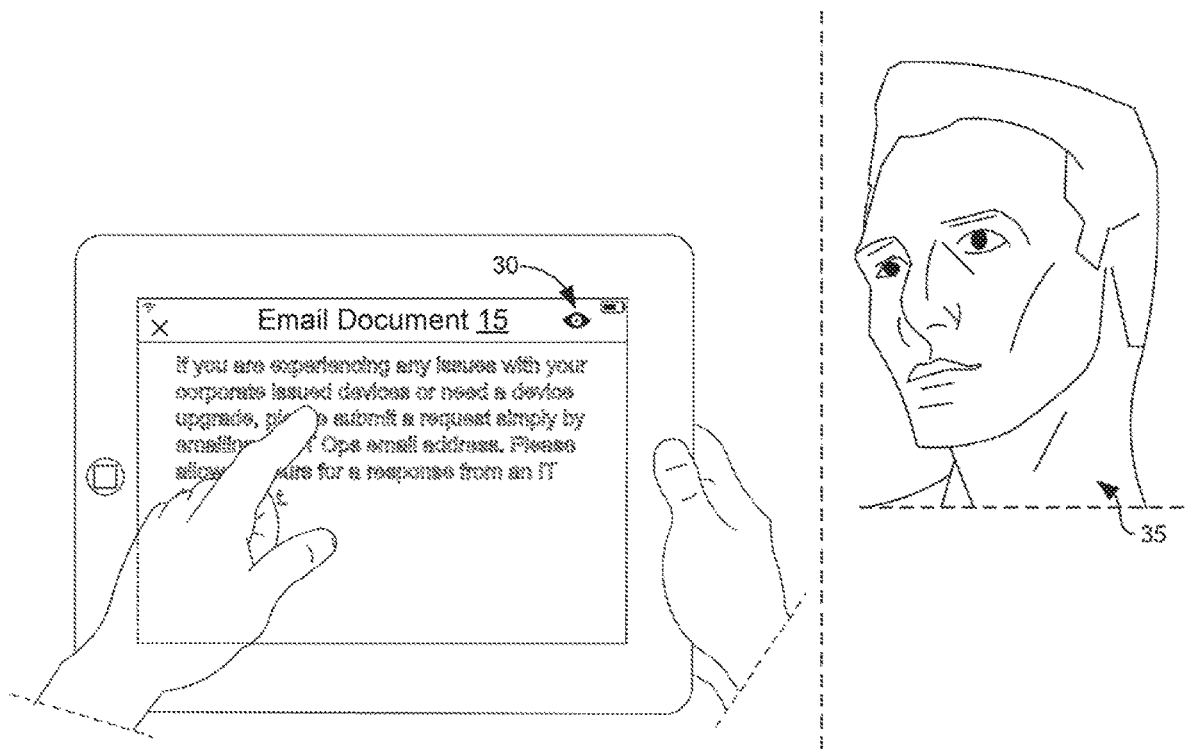
FIG. 2 is another drawing of the client device of FIG. 1 showing content modified to prevent unauthorized viewing by one or more eavesdroppers.

With reference to FIG. 2, the client device 10 is shown in the secure mode of operation where the content of the email document 15 has been modified to make the content unperceivable to those outside the operator range. For instance, an eavesdropper 35 located outside of the operator range will not be able to perceive the content shown in the display 20. However, the user operating the client device 10 will be able to perceive the content shown in the display 20.

In some examples, to make the content unperceivable to an eavesdropper 35, the email document 15 can be modified by adjusting one or more visual settings that impacts an ability to view the email document 15 from an area beyond the operator range for the client device 10. In one examples, if content to be shown in a display 20 includes text, the visual settings that can be adjusted can include a background color of text, a font color of text, a font size of text, and a font style of text. To this end, in some examples, the HTML code, cascading style sheet (CSS) code, or extensible markup language (XML) code associated with a display of the content can be modified to adjust the background color of the text, the font color of the text, the font size of the text, the font style of the text, or other similar property. While examples described herein include an email document 15, the invention is not so limited. In various examples, text, images, or other content shown in a display 20 of a client device 10 can be modified to make the content unperceivable to an eavesdropper 35, as will be described.

Figure 3:
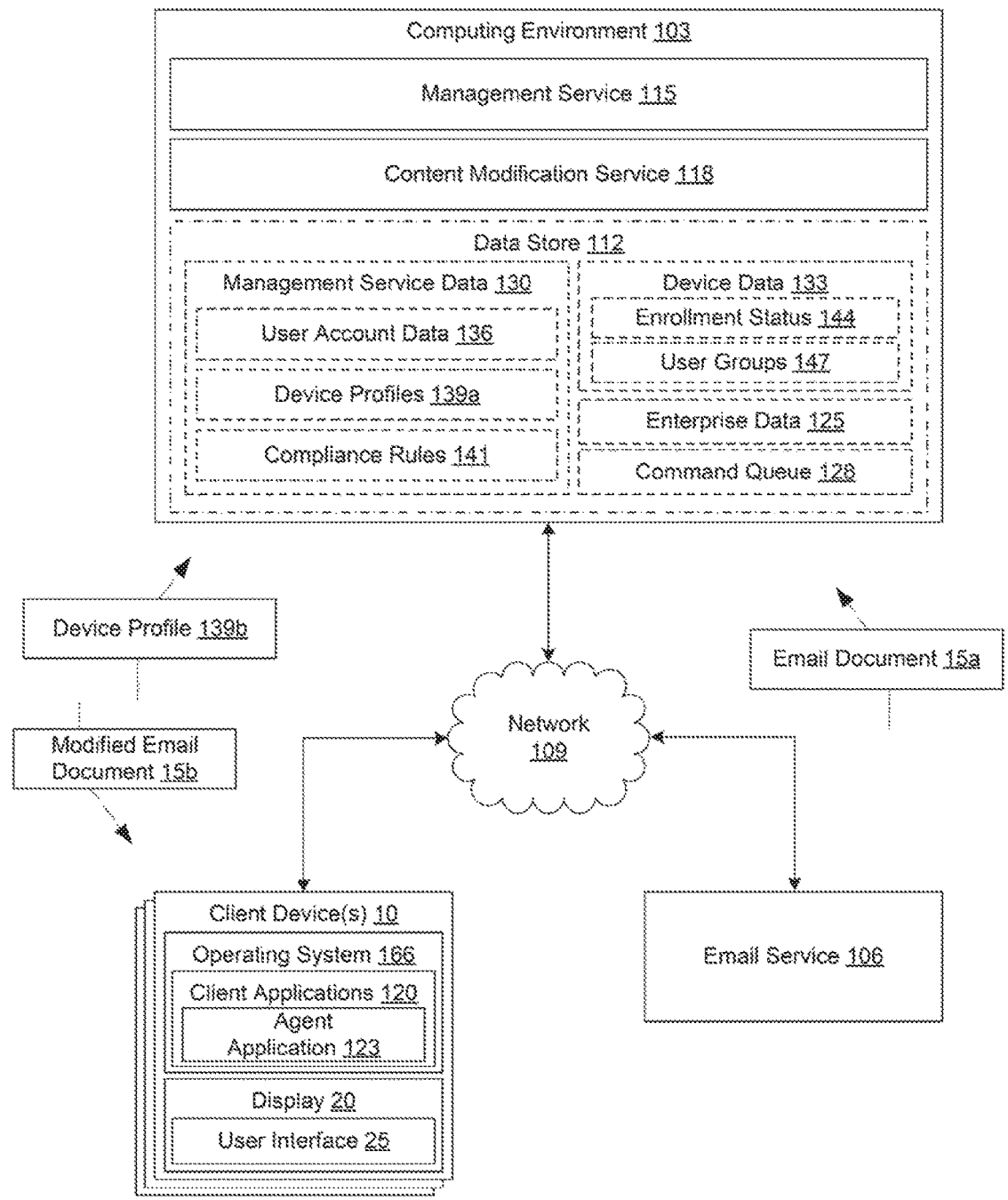
FIG. 3 is a drawing of a networked environment that includes a management service and a client device.

Referring now to FIG. 3, shown is an example of a networked environment 100. The networked environment 100 can include a computing environment 103, client devices 10, and an email service 106 in communication with one other over a network 109. The network 109 can include, for example, the Internet, intranets, extranets, wide area networks (WANs), local area networks (LANs), wired networks, wireless networks, other suitable networks, or any combination of two or more such networks. For example, the networks can include satellite networks, cable networks, Ethernet networks, telephony networks, and other types of networks.

The computing environment 103 and the email service 106 can include, for example, a server computer or any other system providing computing capability. Alternatively, the computing environment 103 and the email service 106 can include a plurality of computing devices that are arranged, for example, in one or more server banks, computer banks, or other arrangements. The computing devices can be located in a single installation or can be distributed among many different geographical locations. The computing environments 103 can also include or be operated as one or more virtualized computer instances. The computing environment 103 and the email service 106 can include a grid computing resource or any other distributed computing arrangement.

For purposes of convenience, the computing environment 103 is referred to herein in the singular. Even though the computing environment 103 is referred to in the singular, it is understood that a plurality of computing environments 103 can be employed in the various arrangements as described above. As the computing environment 103 communicates with the client device 10 remotely over the network 109, the computing environment 103 can be described as a remote computing environment 103 or a remote service.

The computing environment can include a data store 112. The data store 112 can include memory of the computing environment 103, mass storage resources of the computing environment 103, or any other storage resources on which data can be stored by the computing environment 103. The data stored in the data store 112, for example, can be associated with the operation of the various applications or functional entities described below.

The components executed on the computing environment 103 can include, for example, a management service 115, a content modification service 118, as well as other applications, services, processes, systems, engines, or functionality not discussed in detail herein. The management service 115 can be executed to oversee the operation of client devices 10 enrolled with the management service 115. In some examples, an enterprise, such as a company, organization, or other entity, can operate the management service 115 through one or more administrator accounts to oversee or manage the operation of client devices 10 of its employees, contractors, customers, or other users having accounts with the enterprise.

To oversee or manage the client devices 10, the management service 115 can provision the client devices 10 with data if certain criteria is met. For instance, the management service 115 can cause various software components to be installed on a client device 10. Such software components can include, for example, client applications 120, resources, libraries, drivers, device configurations, or other similar components that require installation on the client device 10 as specified by an administrator of the management service 115. The management service 115 can further cause policies to be implemented on a client device 10. Policies can include, for example, restrictions or permissions pertaining to capabilities of a client device 10 such that access to enterprise data is secured on the client device 10.

The management service 115 can interact with one or more client applications 120 executed on the client devices 10, such as web browser applications, email applications, or other types of applications. In one example, the management service 115 interacts with an agent application 123 on the client device 10 to enroll the client device 10 with the management service 115. The agent application 123 can be registered as a device administrator of the client device 10, which can provide the agent application 123 with sufficient privileges to control the operation of the client device 10. In some examples, an administrator of an enterprise can customize a profile for one or more of the client devices 10 using, for example, an administrator console. The profile can include, for example, an XML document. By providing the profile to the agent application 123, the agent application 123 can configure a client device 10 as specified by the administrator using settings enumerated in the profile.

In one example, the agent application 123 can be registered as the device administrator through the installation of a management profile at the operating system of the client device 10 that causes the operating system to designate the agent application 123 as the device administrator. The management service 115 can direct the agent application 123 to perform device management functions on the client device 10. For example, the management service 115 can direct the agent application 123 to control access to certain software or hardware functions available on the client device 10. As a result, the management service 115 can verify that configuration and operation of the client device 10 is in conformance with predefined criteria that ensures that enterprise data 125, or other data, is protected from data loss, unauthorized access, or other harmful events. The management service 115 can further provision enterprise data 125, such as emails, shared documents, or other data, to the client device 10 through the agent application 123.

In one example, the management service 115 can cause the agent application 123 to control use of the client device 10 or provision enterprise data 125 to the client device 10 through use of a command queue 128 provided by the management service 115. The management service 115 can store commands in a command queue 128 associated with a particular client device 10 and can configure the agent application 123 executed by such client device 10 to retrieve the contents of the command queue. In one example, the agent application 123 can be configured to retrieve the contents of the command queue 128 on a configured interval, such as every four hours, or upon a certain event occurring, such as detection of an unauthorized application executed by the client device 10. In any case, the agent application 123 can retrieve the contents of the command queue 128 by checking in with the management service 115 and requesting the contents of the command queue 128. In one example, the contents of the command queue 128 can include a command that the agent application 123 should cause to be executed on the client device 10. In another example, the contents of the command queue 128 can include a resource or client application 120 that the agent application 123 should cause to be installed on the client device 10, which the client device 10 may access through a URL specified by the command retrieved through the command queue 128.

In one example, the management service 115, upon receiving a request to publish a profile to one or more client devices 10, can identify one or more data records associated with such profile and can populate command queues 128 associated with such client devices 10 with commands associated with such data records. For instance, a data record associated with a client application 120 can specify that a particular application should be installed, a particular configuration for the particular application should be applied, and a particular uniform resource locator (URL) from which the particular application can be downloaded. Based on such data record specifications, a command can be generated and placed in a command queue 128 that, when executed by the client device 10, causes the client device 10 to download the particular application from the particular URL, install the application, and change configuration data associated with the particular application to cause the particular application to function in accordance with the particular configuration. Accordingly, upon a request to publish a profile to particular client devices 10, the management service 115 can identify one or more data records associated with the profile and can appropriately populate command queues 128 associated with such client devices 10, which can in turn cause such client devices 10 to operate in accordance with the specifications set forth by an administrator.

The data stored in the data store 112 can include, for example, management service data 130, device data 133, enterprise data 125, the command queue 128, as well as other data. The management service data 130 can include, for example, user account data 136, device profiles 139a . . . 139b, and compliance rules 141, as well as other data. The user account data 136 can include information pertaining to a user account enrolled with the management service 115 through one or more of the client devices 10. Thus, the user account data 136 can include, for example, a username, an email address, a password, a personal identification number (PIN), biometric data, and data relating to an enterprise, as well as other data. The device profiles 139 can include data pertaining to a configuration of a client device 10. For instance, a device profile 139 for a client device 10 can include hardware configurations made on the client device 10 and software configurations made on the client device 10, as well as other information. The hardware configurations can include, for example, a brightness setting for a display 20 or whether a Bluetooth® or a wireless fidelity (Wi-Fi) module is enabled or disabled, as well as similar configurations. The software configurations can include, for example, a listing of client applications 120 installed on the client device 10, settings associated with the installed client applications 120, and other similar configurations.

In further examples, the computing environment 103 can include policies and criteria, referred to as compliance rules 141, that must be met for a client device 10 to be in "compliance" with the management service 115. In one example, the agent application 123 can configure hardware or software functionality of a client device 10 such that the client device 10 operates in conformance with the compliance rules 141. Additionally, the agent application 123 can identify when the client device 10 is not in conformance with the compliance rules 141 and can take appropriate remedial actions, such as denying access to enterprise data 125, particular features of the agent application 123, or other remedial action.

In some examples, the management service 115 communicates with the agent application 123 or other client application 120 executable on the client device 10 to determine whether vulnerabilities exist on the client device 10 that do not satisfy compliance rules 141 defined by an administrator. Vulnerabilities can include, for example, the presence of a virus or malware on the client device 10, the client device 10 being "rooted" or "jailbroken" where root access is provided to a user of the client device 10, the presence of particular applications or files, questionable device configurations, vulnerable versions of client applications 120, or other vulnerability as can be appreciated.

Device data 133 can include, for example, data pertaining to an enrollment status 144 for individual ones of the client devices 10. In one example, a client device 10 designated as "enrolled" can be permitted to access the enterprise data 125 while a client device 10 designated as "not enrolled" (or having no designation) can be denied access to the enterprise data 125. Device data 133 can also include data pertaining to user groups 147. An administrator can specify one or more of the client devices 10 as belonging to a particular user group 147. The management service 115 can use a profile applicable to the particular user group 147 and/or applicable to an operating system (or other feature) of the client devices 10 to configure the client devices 10.

The client device 10 can include a processor-based system, such as a computer system, that can include a desktop computer, a laptop computer, a personal digital assistant, a cellular telephone, a smartphone, a set-top box, a music player, a tablet computer system, a game console, an electronic book reader, or any other device with like capability. The client device 10 can also be equipped with networking capability or networking interfaces, including a localized networking or communication capability, such as a near-field communication (NFC) capability, radio-frequency identification (RFID) read or write capability, or other localized communication capability.

The client devices 10 can include an operating system 166 configured to execute various client applications 120, such as the agent application 123 as well as other applications. Some client applications 120 can access network content served up by the computing environment 103 or other servers, thereby rendering a user interface 25 on a display 20, such as a liquid crystal display (LCD), touch-screen display, or other type of display device. To this end, some client applications 120 can include a browser or a dedicated application, and a user interface 25 can include a network page, a native application screen, or other interface. Further, other client applications 120 can include device management applications, enterprise applications, social networking applications, word processors, spreadsheet applications, media viewing application, or other applications.

Figure 4A:
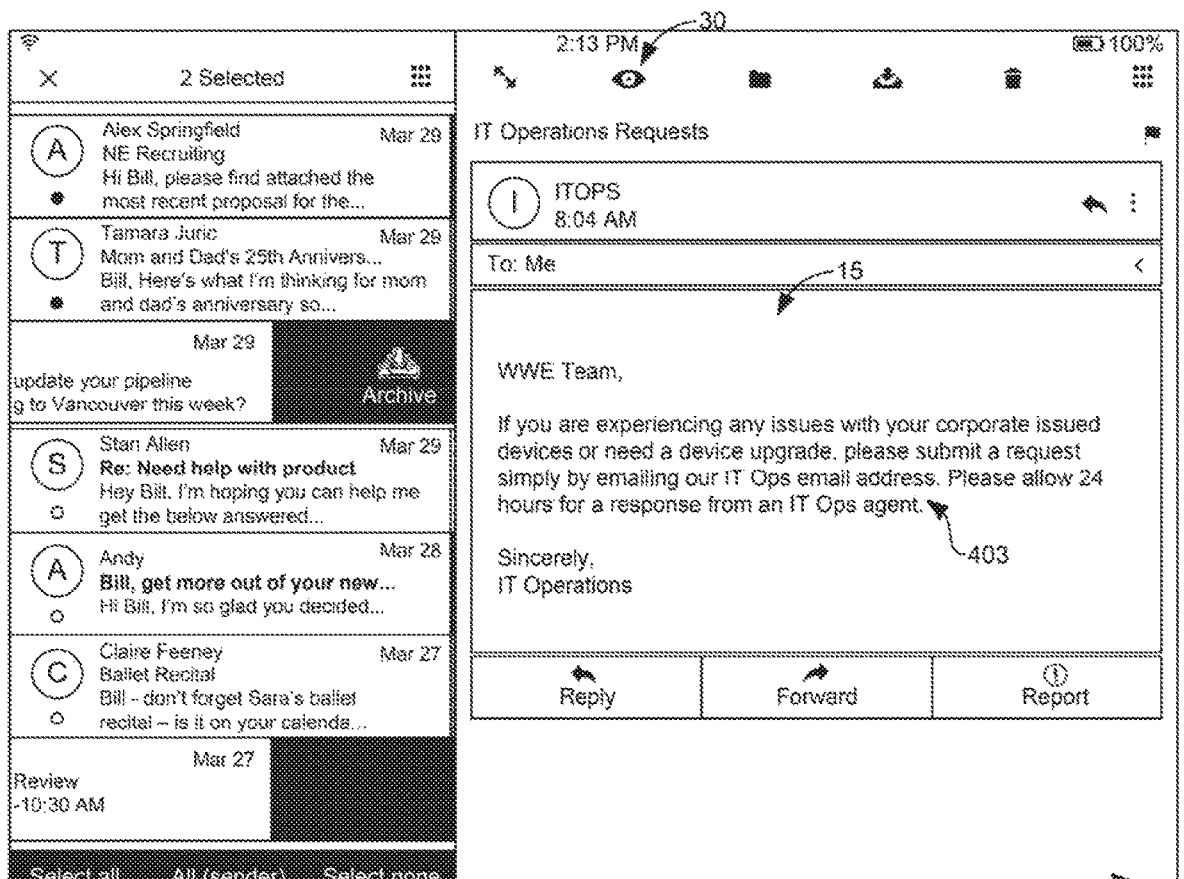
FIG. 4A is a drawing of a user interface for an email application having unmodified content.

Moving on to FIG. 4A, shown is an example of a user interface 25 that can be shown in a display 20 of a client device 10. The user interface 25 can be generated by a client application 120, such as an email application or other application. For instance, a user can navigate the user interface 25 of an email application to send or review email documents 15, access a calendar, or perform other tasks. When viewing an email document 15, a display 20 of a client device 10 can include content 403 that can be sensitive. For instance, the email document 15 can include confidential information or other information that should not be available to eavesdroppers 35 in a vicinity of a client device 10. The non-limiting example of FIG. 4A shows content 403 rendered in a display 20 without modification.

Figure 4B:
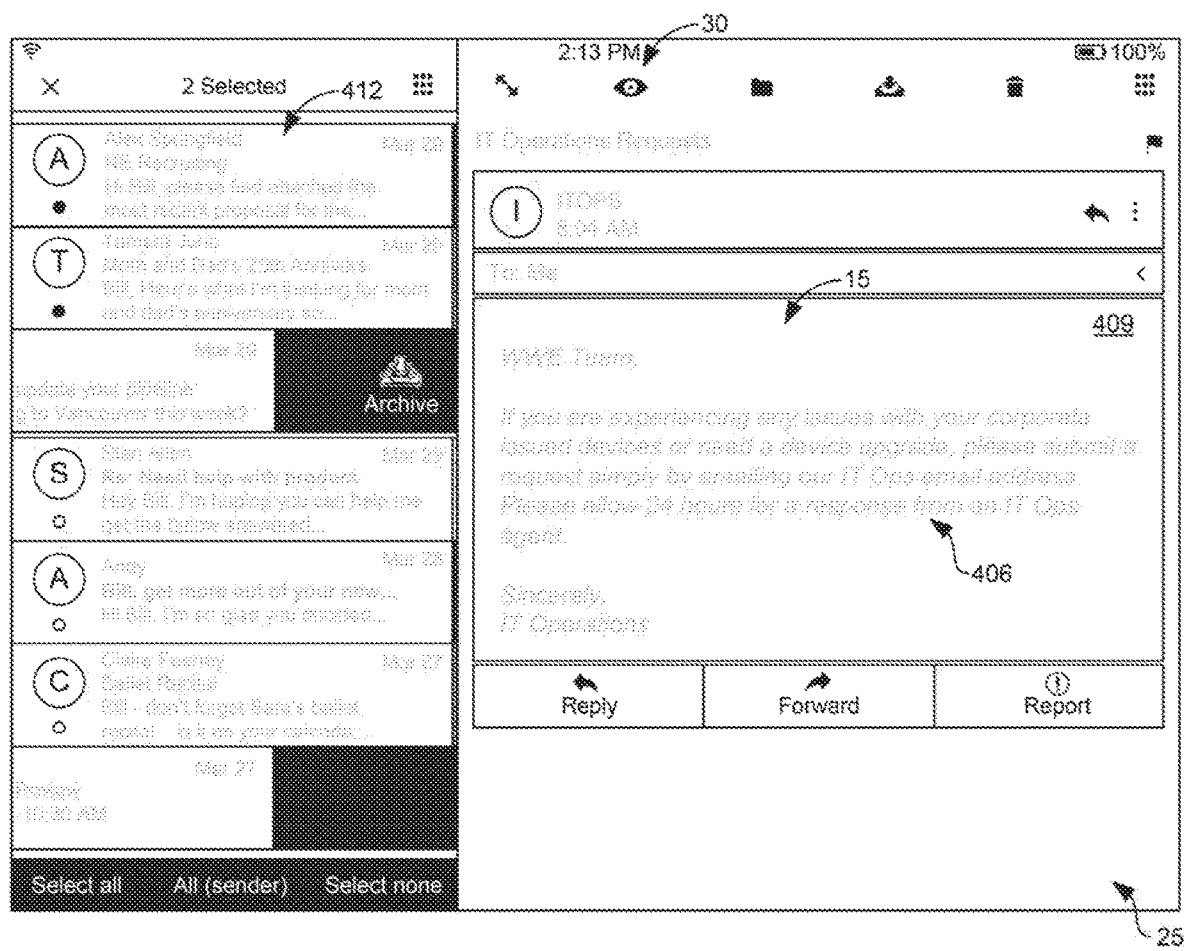
FIG. 4B is a drawing of a user interface for an email application having content modified to prevent unauthorized viewing by one or more eavesdroppers.

Referring now to FIG. 4B, modified content 406 (a modified version of the content 403 from FIG. 4A) can be shown in the display 20 so that only a user within an operator range can perceive the modified content 406. The user can select or otherwise manipulate the secure view icon 30 to cause the client application 120 to toggle between an original form of the content 403 (shown in FIG. 4A) and the modified content 406 shown in FIG. 4B. Those outside of the operator range may find it difficult or impossible to perceive the content shown in the display 20.

In some examples, the computing environment 103 or the client application 120 can generate the modified content 406 adjusting a background color of the text, a font color of the text, a font size of the text, and a font style of the text. The font style of the text can include bold, italics, underline, small caps, upper caps, skew, or other properties of the text that can be adjusted. In the non-limiting example of FIG. 4B, the original content 403 of the email document 15 is modified to adjust the color of the text to be within a certain color threshold of the background region 409 while the font size of the text increased and the text is skewed or changed to italics.

In some examples, the computing environment 103 or the client application 120 generates the modified content 406 by adjusting HTML or CSS code extracted from the email document 15. In further examples, the computing environment can adjust the visual settings to have the font color of the text be within a color threshold of the background color of the text by detecting a color of the background region 409. The computing environment 103 or the client application 120 can modify the content 403 of the email document 15 as well as other portions of the user interface 25. For instance, text pertaining to other emails shown in a sidebar 412 can also be modified while other features, such as user interface elements, can remain unaltered.

Figure 5:
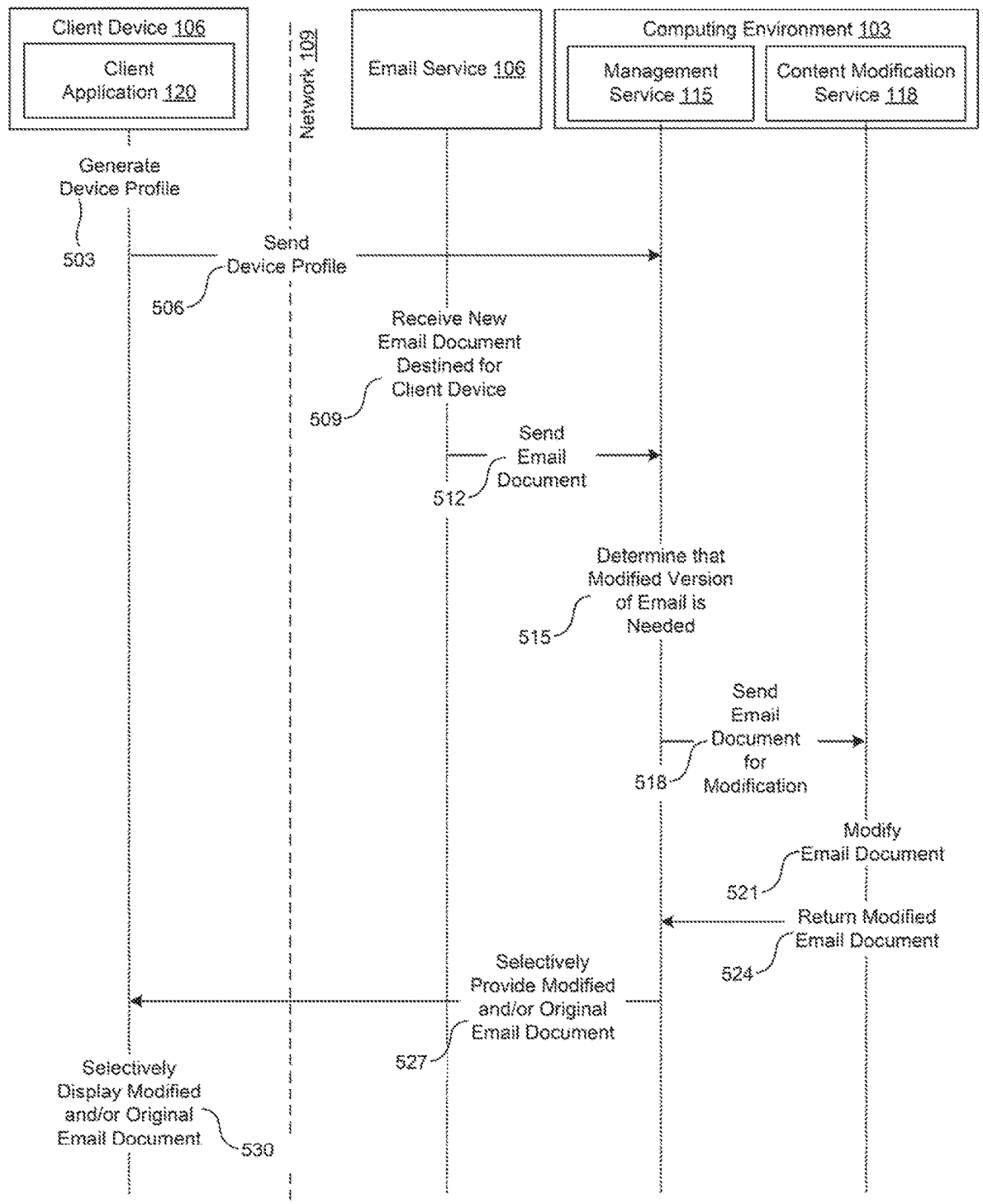
FIG. 5 is a sequence diagram illustrating an example operation of the components of the networked environment of FIG. 3.

Turning now to FIG. 5, a sequence diagram 500 is shown that provides an example operation of the networked environment 100. Although various operations are shown as being performed by the computing environment 103, in alternative examples, at least a portion of the operations can be performed by a client application 120 on the client device 10. The separation or segmentation of functionality as discussed herein is presented for illustrative purposes only.

Beginning with step 503, the client device 10 can generate a device profile 139 that includes data pertaining to a configuration of a client device 10. In one example, the device profile 139 for the client device 10 can include hardware configurations made on the client device 10 and software configurations made on the client device 10, as well as other information. In some examples, the device profile 139 can include whether the client device 10 is in a secure mode or non-secure mode of operation, as specified by a user using, for example, the secure view icon 30. In additional examples, the device profile 139 can include a geographic location of the client device 10, a current local time on the client device 10, or an indication of whether the client device 10 is in airplane mode, as well as other information that can be useful to determine whether the client device 10 is in compliance or to determine whether the client device 10 should be provisioned with either the modified version or the original version of the email document 15.

Next, in step 506, the client device 10 can send the device profile 139 to the management service 115 over the network 109.

In step 509, the email service 106 can receive a new email document 15 destined for the client device 10 or an account associated with the client device 10.

In step 512, the email service 106 can send the email document 15 to the management service 115. To this end, in some examples, the computing environment 103 can act as a proxy between the email service 106 and the client device 10 and can determine whether to provision an email document 15 to the client device 10 based on whether the client device 10 is in compliance. In other words, the client device 10 does not receive the email document 15 directly from the email service 106, although, in examples where a client application 120 is configured to modify the content 403, the client application 120 can receive the email document 15 directly from the email service 106.

Next, in step 515, the management service 115 can determine that a modified version of the email document 15 is needed based on various information, such as settings specified by a sender of the email document 15, a word or phrase detected programmatically in the email document 15, whether the email document 15 has been marked with high urgency, whether an administrator has required the email document 15 to be modified based on compliance rules 141 specified by the administrator, a device profile 139 generated for a client device 10, whether the email document 15 includes an attachment, whether the user of the client device 10 has toggled the secure view icon 30, and whether the client device 10 is in compliance with one or more compliance rules 141, as well as other information.

In one example, the management service 115 can access a device profile 139 for the client device 10 to determine, for example, whether a setting specified on the client device 10 indicates that the email document 15 should be modified. For instance, the setting can indicate that a user of the client device 10 has enabled a secure mode of operation by toggling the secure view icon 30.

In step 518, the management service 115 can send the email document 15 to the content modification service 118 for modification.

In step 521, the content modification service 118 can generate the modified version of the email document 15, for example, by adjusting one or more visual settings. In some examples, the computing environment 103 can generate modified content 406 by adjusting a background color of the text, a font color of the text, a font size of the text, a font style of the text, or other visual property. For instance, the font style of the text can include bold, italics, underline, small caps, upper caps, skew, or other properties of the text that can be adjusted.

In further examples, the content modification service 118 can identify actions that should be performed by the client application 120 before or while displaying the modified version of the email document 15, such as adjusting a brightness setting for the display 20, disabling an ability to perform zoom functions, or modifying another setting that can prevent users outside the operator range from viewing content shown in the display 20.

In step 524, the content modification service 118 can return the email document 15 with the modified content 406 to the management service 115.

Next, in step 527, the management service 115 can selectively provide the modified version or the original version of the email document 15. For instance, depending on which mode of operation is active through interaction with the secure view icon 30, the management service 115 can provide one of the original version or the modified version of the email document 15. In additional examples, the computing environment 103 can provide both the original version and the modified version of the email document 15. In this example, the client application 120 can selectively provide either the modified version or the original version of the email document 15 depending on which mode of operation is active.

In step 530, in instances where both the modified version and the original version of the email document 15 are provided to a client device 10, the client application 120 can selectively provide either the modified version or the original version of the email document 15. For instance, depending on which mode of operation is active through interaction with the secure view icon 30, the client application 120 can provide one of the original version or the modified version of the email document 15. Thereafter, the process can proceed to completion.

Figure 6:
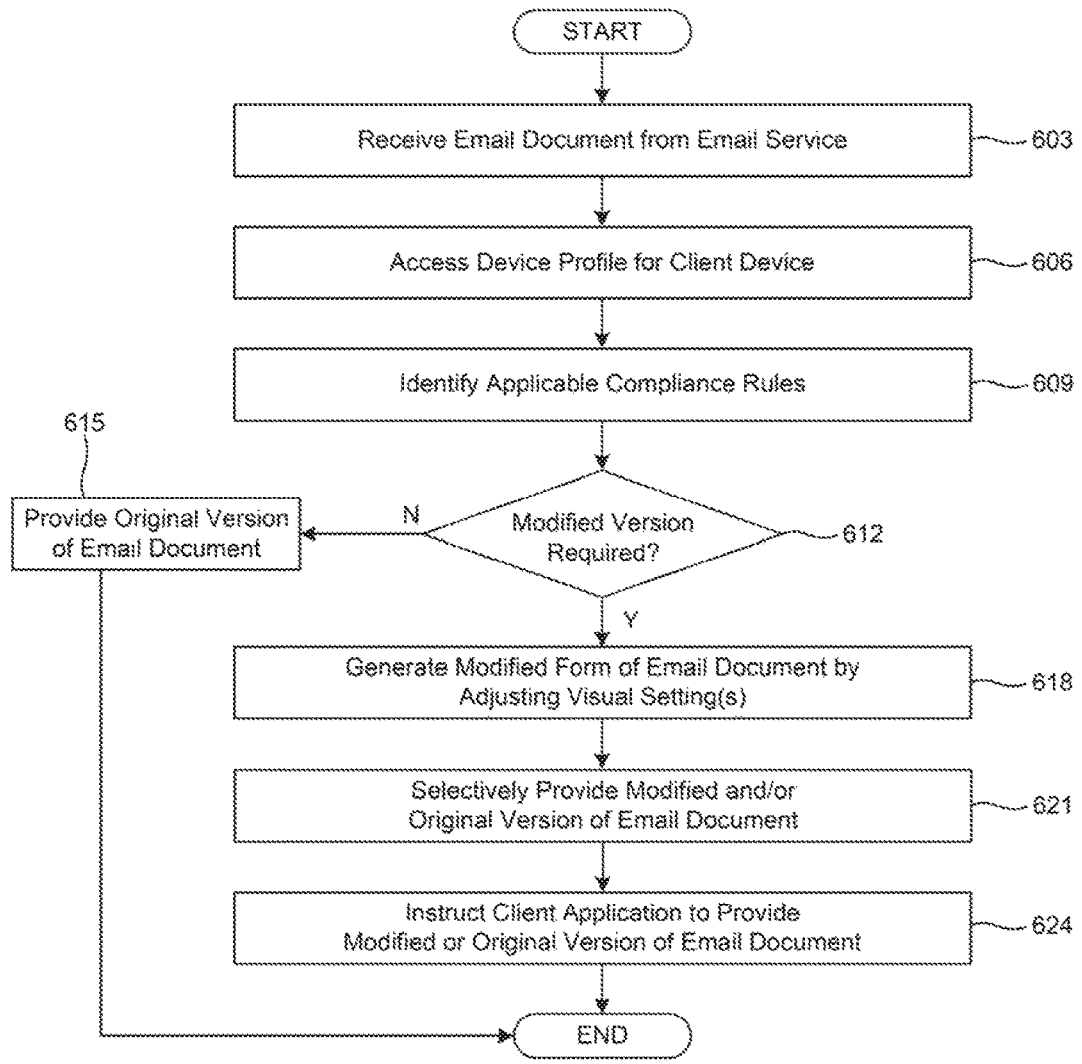
FIG. 6 is a flowchart illustrating an example operation of the management service or a client application.

Moving on to FIG. 6, shown is a flowchart that provides one example of the operation of a portion of the computing environment 103. The flowchart of FIG. 6 can be viewed as depicting an example of elements of a method implemented by the management service 115 or the content modification service 118 executing in the computing environment 103 according to one or more examples. Alternatively, the flowchart of FIG. 6 can be viewed as depicting an example of elements of a method implemented by the agent application 123 or other client application 120 executing in a client device 10 according to one or more examples. The separation or segmentation of functionality as discussed herein is presented for illustrative purposes only.

Beginning with step 603, the computing environment 103 can receive an email document 15 from the email service 106 destined for a client device 10. In some examples, the computing environment 103 can act as a proxy between the email service 106 and the client device 10 and can determine whether to provision an email document 15 to the client device 10 based on whether the client device 10 is in compliance with one or more compliance rules 141. In other words, the client device 10 does not receive the email document 15 directly from the email service 106, although, in examples where a client application 120 is configured to modify the content 403, the client application 120 can receive the email document 15 directly from the email service 106.

The computing environment 103 can determine whether to modify the content 403 of the email document 15 based on various information, such as settings specified by a sender of the email document 15, a word or phrase detected programmatically in the email document 15, whether the email document 15 has been marked with high urgency, whether an administrator has required the email document 15 to be modified based on compliance rules 141 specified by the administrator, a device profile 139 generated for a client device 10, whether the email document 15 includes an attachment, whether the user of the client device 10 has toggled the secure view icon 30, as well as other information.

Thus, in some examples, in step 606, the computing environment 103 can access a device profile 139 for the client device 10 to determine, for example, whether a setting specified on the client device 10 indicates that the email document 15 should be modified. For instance, the setting can indicate that a user of the client device 10 has enabled a secure mode of operation by toggling the secure view icon 30. Moreover, in some examples, the user of the client device 10 can specify a setting to receive both an original and a modified version of the email document 15 which can be selectively displayed based on the user. In further examples, the device profile 139 can indicate that the client device 10 is in airplane mode or has another setting enabled that indicates the presence of potential eavesdroppers 35.

In step 609, the computing environment 103 can identify applicable compliance rules 141 from the data store 112. For instance, an administrator can specify compliance rules 141 indicating that all email documents 15 destined for client devices 10 in a particular user group 147 are to be modified. In another example, an administrator can specify compliance rules 141 indicating that email documents 15 are to be modified if the client device 10 attempts to access the email documents 15 outside of an authorized time frame or outside of an authorized geographic area (determined using a geofence). In another example, an administrator can specify compliance rules 141 indicating that email documents 15 destined for a client device 10 are to be modified if the client device 10 attempts to access the email documents 15 outside of an authorized time frame or outside of an authorized geographic area determined using a geofence.

In step 612, the computing environment 103 can determine whether a modified version of the email document 15 and its content 403 is required based at least on the device profile 139, one or more compliance rules 141, or other information. If a modified version of the email document 15 is not required, the process can proceed to step 615.

In step 615, the computing environment 103 can provide the original version of the email document 15 as received from the email service 106 to the client device 10. Thereafter, the process can proceed to completion. Referring back to step 612, if the computing environment 103 determined that a modified version of the email document 15 is required, the process can proceed to step 618.

In step 618, the computing environment 103 can generate the modified version of the email document 15, for example, by adjusting one or more visual settings. In some examples, the computing environment 103 can generate modified content 406 adjusting a background color of the text, a font color of the text, a font size of the text, and a font style of the text. The font style of the text can include bold, italics, underline, small caps, upper caps, skew, or other properties of the text that can be adjusted.

In some examples, the computing environment 103 or the client application 120 generates the modified content 406 by adjusting HTML or CSS code extracted from the email document 15. In further examples, the computing environment can adjust the visual settings to have the font color of the text be within a color threshold of the background color of the text by detecting a color of a background region 409 that is to include the text. In some examples, the computing environment 103 can determine the color threshold as a function of a size of a display of the client device using:

$$Hex(Color_{Background}) - Hex(Color_{Text}) \propto \frac{1}{Size_{Text}}. \quad \text{(eq. 1)}$$

In further examples, a type of the display 20 can be used in modifying the content 403 of the email document 15. For instance, if a display 20 has a wide viewing angle, such as in-plane switching LCD displays, the email document 15 can be adjusted more drastically, as opposed to other displays 20 having more narrow viewing angles.

In step 621, the computing environment 103 can selectively provide the modified version or the original version of the email document 15. For instance, depending on which mode of operation is active through interaction with the secure view icon 30, the computing environment 103 can provide one of the original version or the modified version of the email document 15. In additional examples, the computing environment 103 can provide both the original version and the modified version of the email document 15. In this example, the client application 120 can selectively provide either the modified version or the original version of the email document 15 depending on which mode of operation is active.

In another example, the computing environment 103 can selectively provide one of the original version or the modified version of the email document 15 based on a compliance rule 141 or a device profile 139. For instance, if a device profile 139 indicates that a client device 10 is in airplane mode or has recently activated airplane mode, the computing environment 103 can provide the client device 10 with the modified version of the email document 15. Similarly, if a device profile 139 indicates that a client device 10 is in or outside a particular geographic area, the computing environment 103 can provide the client device 10 with the modified version of the email document 15.

In instances where both the modified version and the original version of the email document 15 are provided to a client device 10, in step 624, the computing environment 103 can instruct the client application 120 to provide either the modified version or the original version of the email document 15. The computing environment 103 can thus control the display of either the modified version or the original version of the email document 15 based on the device profile 139, the compliance rules 141, as well as other information. Thereafter, the process can proceed to completion.

Figure 7:
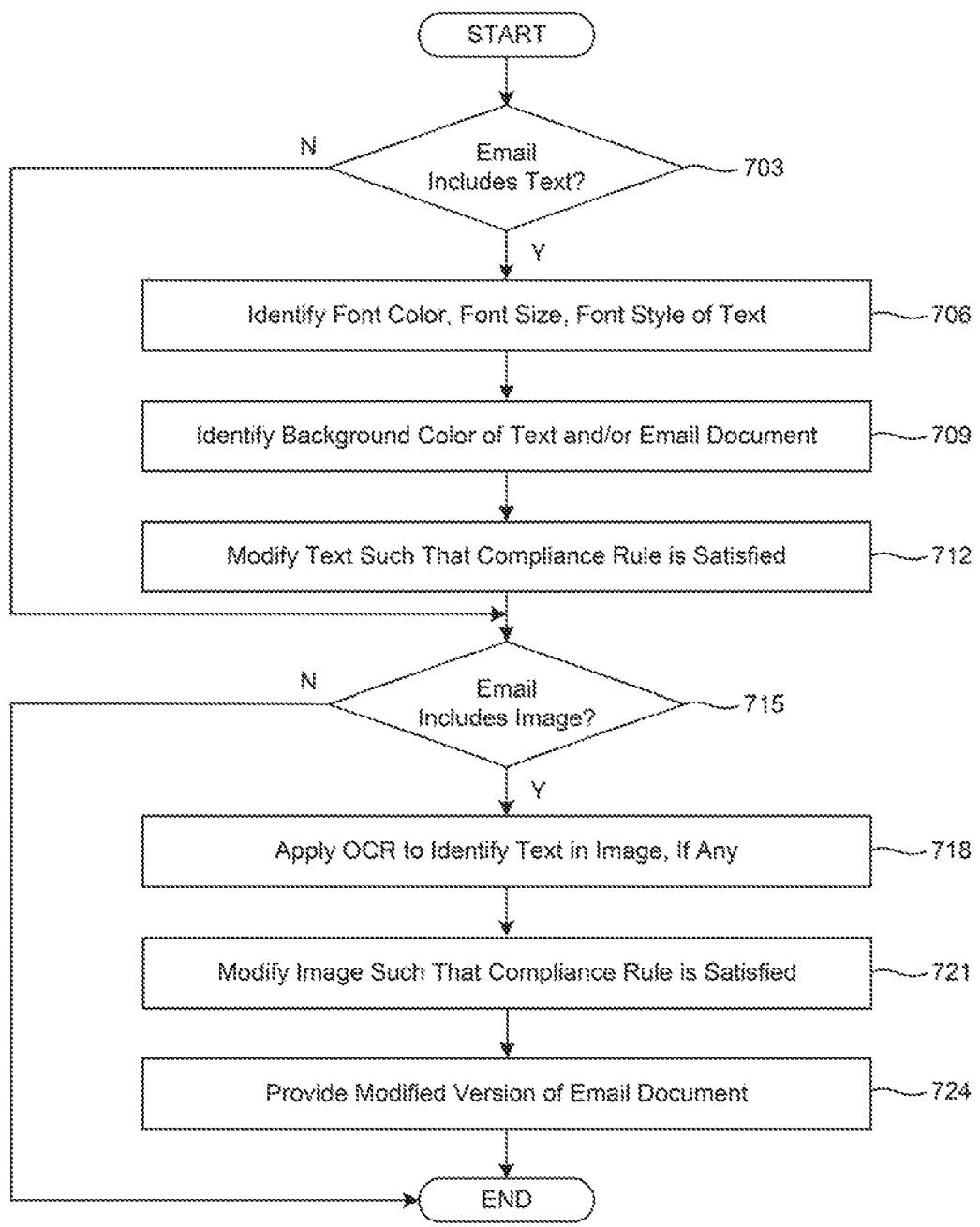
FIG. 7 is another flowchart illustrating an example operation of the management service or a client application.
Figure 8A:
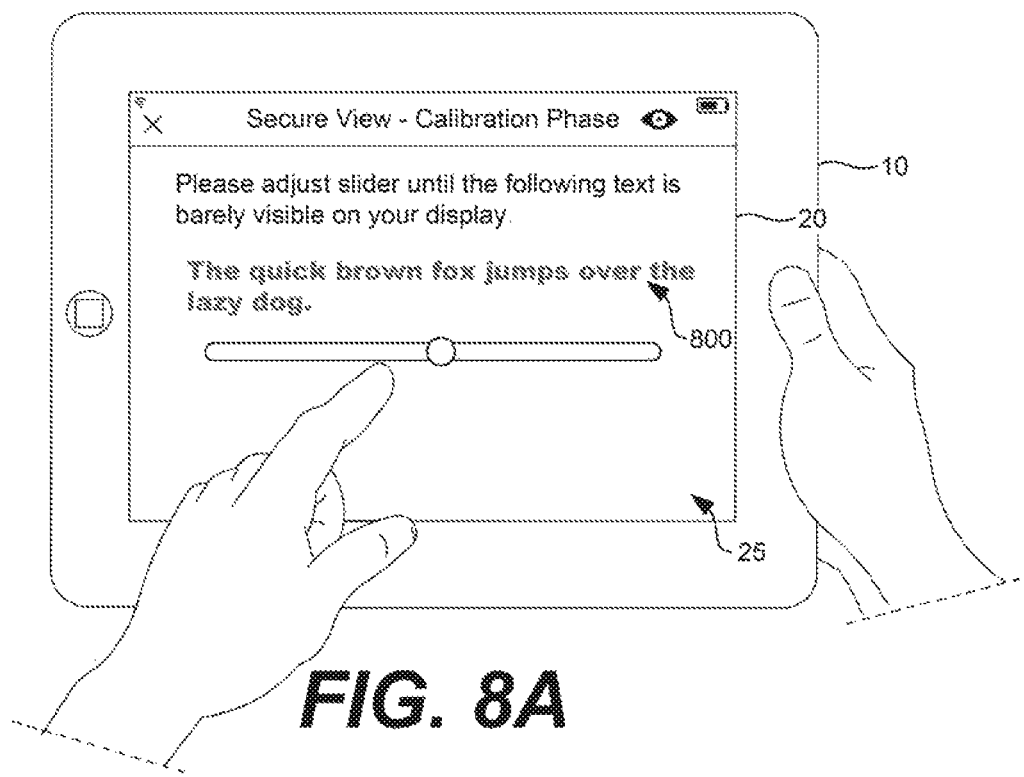
FIGS. 8A, 8B, 9A, and 9B are drawings of user interfaces for performing a calibration to obtain settings that prevent unauthorized viewing of content by one or more eavesdroppers.
Figure 8B:
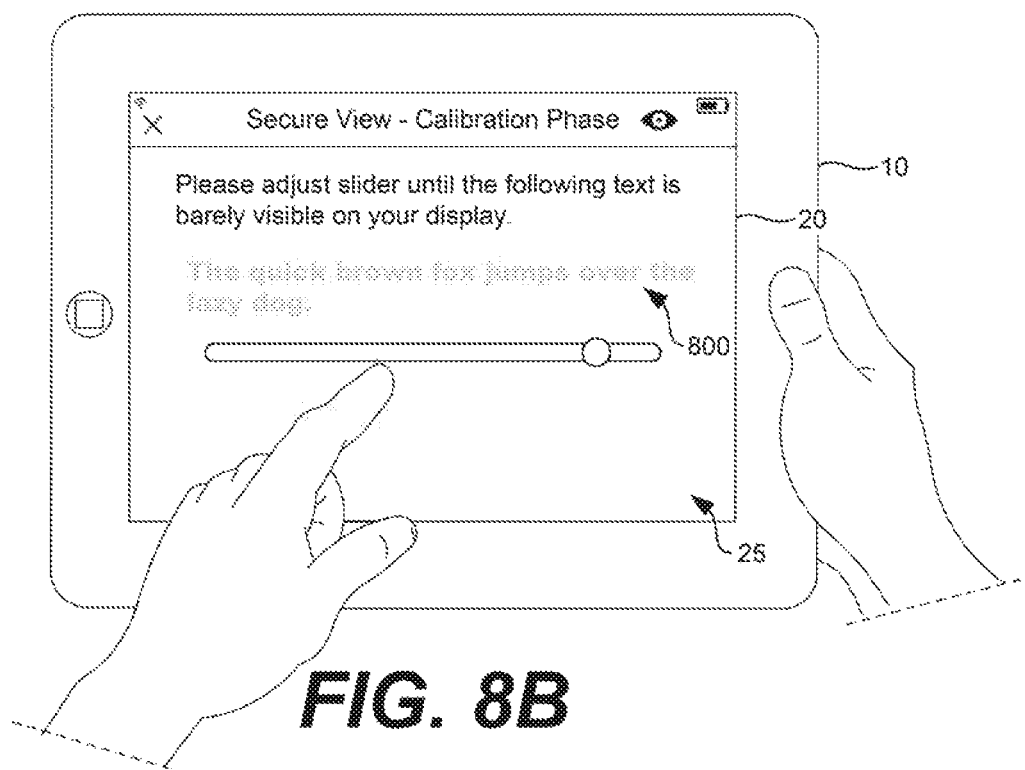
Figure 9A:
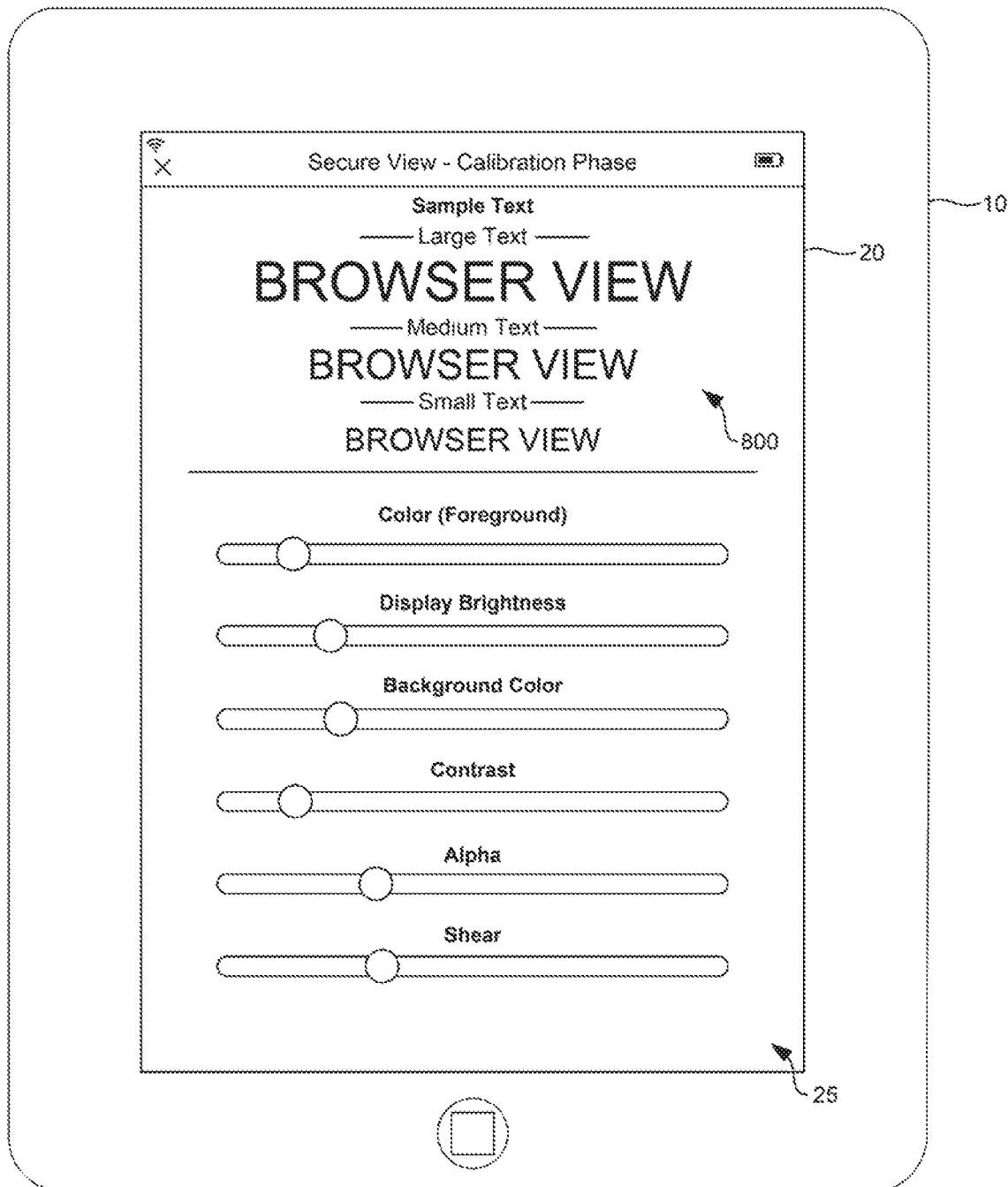
Figure 9B:
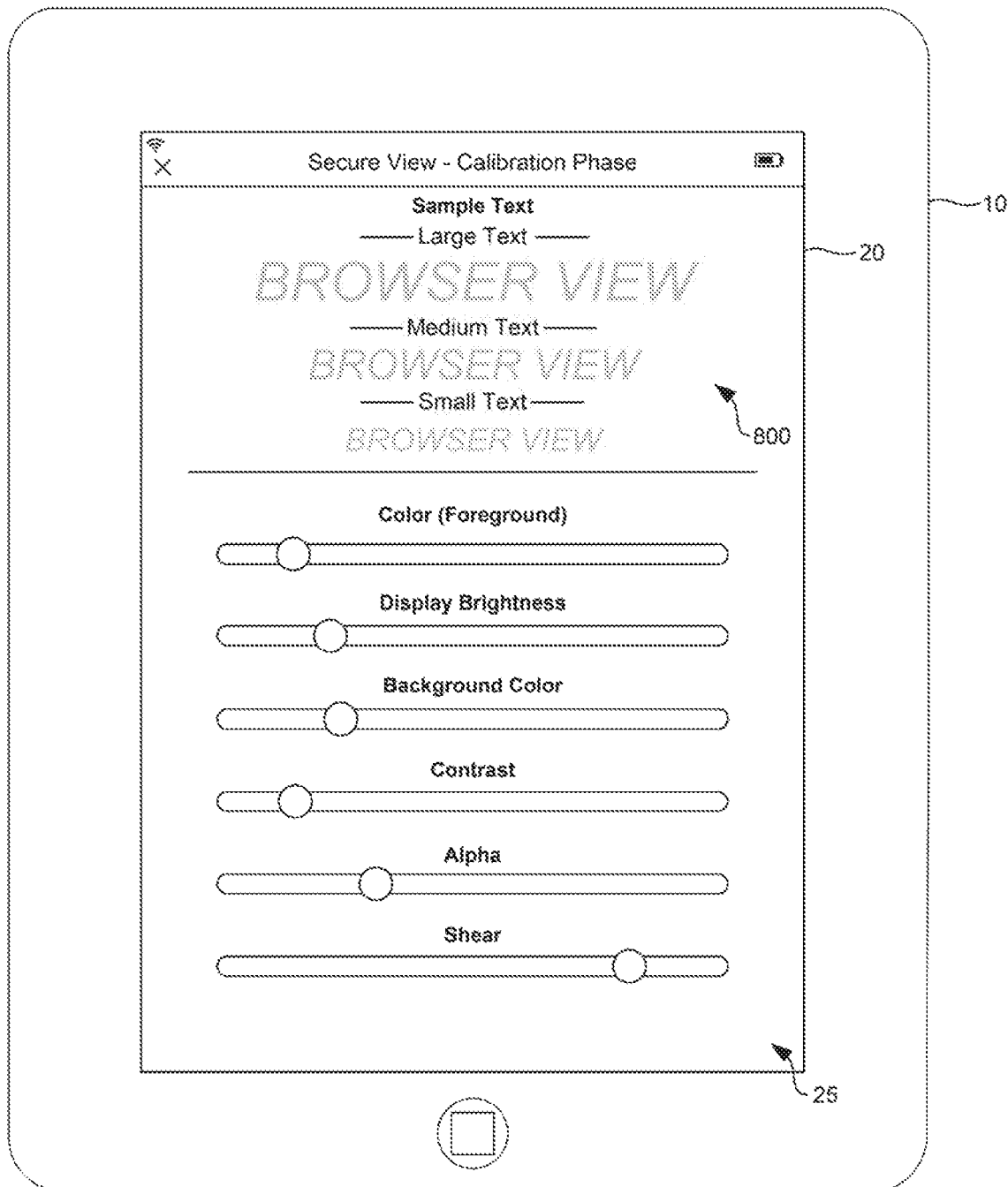

Moving on to FIG. 7, shown is a flowchart that provides one example of the operation of a portion of the computing environment 103 in performing step 618 as described in FIG. 6. The flowchart of FIG. 7 can be viewed as depicting an example of elements of a method implemented by the management service 115 or the content modification service 118 executing in the computing environment 103 according to one or more examples. Alternatively, the flowchart of FIG. 7 can be viewed as depicting an example of elements of a method implemented by the agent application 123 or other client application 120 executing in a client device 10 according to one or more examples. The separation or segmentation of functionality as discussed herein is presented for illustrative purposes only.

Beginning with step 703, the computing environment 103 can determine whether an email document 15 includes text. For instance, the email document 15 accessed in step 603 can be analyzed to determine whether text is included in a body of the email document 15. If the email document 15 does not include text, the process can proceed to step 715, as will be discussed. Alternatively, if the email document 15 includes text, the process can proceed to step 706.

In step 706, the computing environment 103 can identify a font color, a font size, a font style, as well as other properties associated with the text. In some examples, the computing environment 103 can identify the properties associated with the text by identifying hexadecimal color values or other values from HTML or CSS tags in the email document 15. In additional examples, the computing environment 103 can identify any display settings on the client device 10 that may override any settings specified in the email document 15. For instance, some client devices 10 can disable the display of HTML for email documents 15. To this end, the computing environment 103 can determine a default font size, font color, font style, or other property associated with the display of text from the email document 15.

Next, in step 709, the computing environment 103 can identify the background color of the text or can identify a default background color of the email document 15 that will be used in the display of the email document 15 on the client device 10. Similarly, the computing environment 103 can identify the background color of text in the email document 15 by identifying hexadecimal color values or other values from HTML or CSS tags in the email document 15.

In step 712, the computing environment 103 can modify the text of the email document 15, for example, by adjusting one or more visual settings, such that one or more compliance rules 141 are satisfied. In some examples, the computing environment 103 can adjust a background color of the text, a font color of the text, a font size of the text, a font style of the text, or other property associated with the text. In one example, the computing environment 103 can increase the font size of the text, skew the text, and change the font color of the text and a background color of the text to be within a color threshold, determined as a function of a size of the display using eq. 1.

In step 715, the computing environment 103 can determine whether an email document 15 includes an image, such as an inline image or an attachment. For instance, the email document 15 can be analyzed to determine whether a body of the email document 15 includes the <IMG></IMG> tag that indicates the presence of an inline image. If the email document 15 does not include an image, the process can proceed to completion. Alternatively, if the email document 15 includes an image, the process can proceed to step 718.

In step 718, the computing environment 103 can apply optical character recognition (OCR) to identify text in the image. If text is identified, step 706, step 709, and step 712 can be performed; however, as opposed to using HTML or CSS properties, the computing environment 103 can employ pixel modification and image processing.

In step 721, the computing environment 103 can modify one or more images of the email document 15, for example, by adjusting one or more visual settings, such that one or more compliance rules 141 are satisfied. In some examples, the computing environment 103 can adjust the contrast of the image or modify each pixel value of the image such that an overall contrast is reduced. Additionally, the computing environment 103 can adjust a background color of certain regions of the image, skew the image, resize the image, or perform another action such that the image is viewable in the operator range and unperceivable outside the operator range.

In step 724, the computing environment 103 can provide the modified version of the email document 15 that includes, for example, the modified text and/or the modified image to the client device 10. The computing environment 103 can selectively provide the email document 15, as described above with respect to step 621 and step 624. Thereafter, the process can proceed to completion.

Referring next to FIGS. 8A, 8B, 9A, and 9B, examples of various user interfaces 25 are shown that can be used during a calibration phase to obtain settings that prevent unauthorized viewing of content by one or more eavesdroppers, e.g., during the secure mode of operation. Since different displays 20 have characteristics varying from one device to another, a secure view calibration can be required prior to entering into a secure mode of operation or otherwise modifying the display of content in a document. For instance, in the secure view calibration phase, a user of a client device 10 can adjust various content or display attributes, such as a foreground color, a display brightness, a background color, contrast, an alpha setting, a shear, and other settings. Any settings specified during the secure view calibration phase can be used during the secure mode of operation when toggled by the user or otherwise applied by a client application 120 or the computing environment 103. Additionally, during the secure view calibration phase, sample text 800 can be provided such that the user can test the readability of the text as well as the effectiveness of hiding content. For instance, the secure view calibration phase can ask the user to view the text from varying angles and adjust the settings such that the text is readable from when a user is directly in front of the display 20 while being illegible when viewing the display 20 from other angles or regions.

Figure 10:
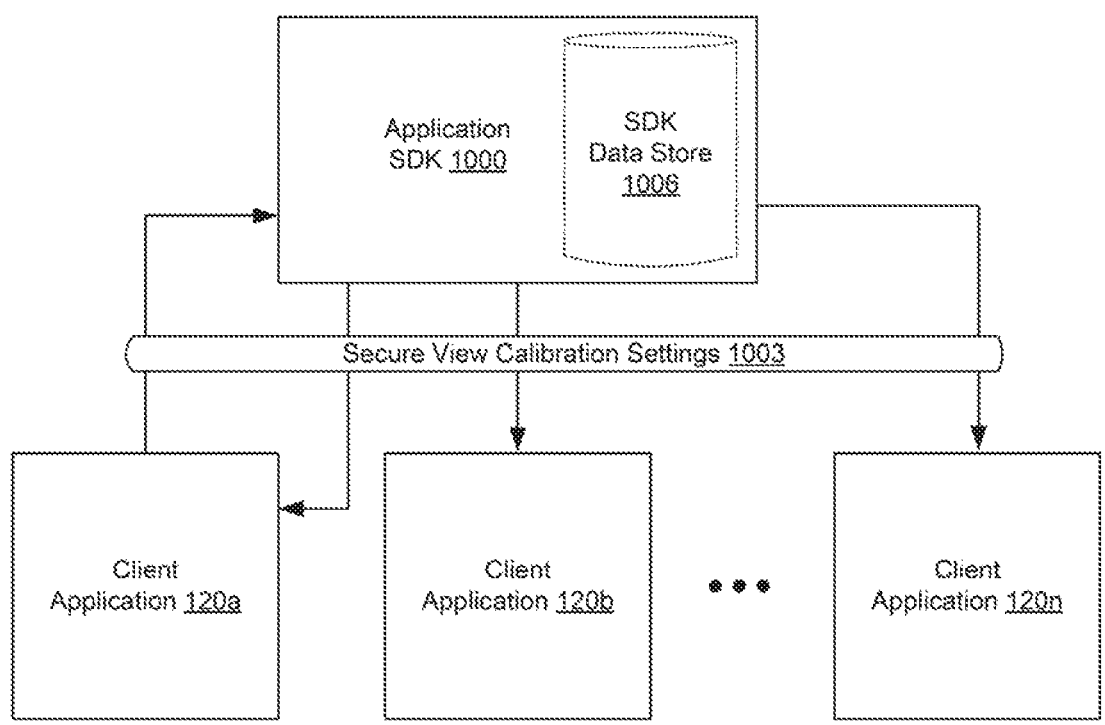
FIG. 10 is a drawing of an application software development kit (SDK) that may be included by developers in an application to share settings obtained during a calibration phase with other applications.

Turning now to FIG. 10, an application software development kit (SDK) 1000 can be included by developers of a client application 120a to share settings obtained during a calibration phase with other client applications 120b . . . 120n. For instance, a first time a client application 120a attempts to render content that may be sensitive, the client application 120a can require the user of the client device 10 to perform the secure view calibration phase, the result of which generates secure view calibration settings 1003. Once a user finalizes the calibration phase by specifying ideal settings for his or her device, any uses of the secure view can be applied in various applications 120a . . . 120b on the same client device 10, so long as each client application 120 includes the same application SDK 1000. A particular one of the client applications 120 that performs the secure view calibration phase can provide the secure view calibration settings 1003 for storage in an SDK data store 1006. When a client application 120 that includes necessary permissions and the application SDK 1000 attempts to enter into the secure mode of operation, the secure view calibration settings 1003 can be used to modify content.

Additionally, in some examples, an administrator can adjust the secure view calibration settings 1003 remotely, as opposed to an end user of the client device 10 being required to provide the secure view calibration settings 1003. Accordingly, the administrator can provide settings for different types of devices, such as iOS or Android®. In some examples, the secure view calibration settings 1003 can be included in a document, such as in a header of the email document 15. A recipient of the email document 15 can apply the settings designated in the email document 15 or can apply a different set of secure view calibration settings 1003.

Additionally, in some examples, a user can send an email document 15 from a client application 120a to another client application 120b while adding an information rights management (IRM) property that causes the email document 15 to be viewed in the secure mode of operation. The IRM property can include, for example, a property in an email header, email subject line, body of the email document 15, or other appropriate location. Once an email document 15 is marked to be opened in a secure mode of operation by a sender, the secure mode of operation can be automatically entered into when the email document 15 is accessed on a client device 10 of the recipient. The recipient can also manually open the email document 15 in secure view mode, for example, by selecting the secure view UI control, even if an IRM property is not present in the email document 15. In additional examples, email documents 15 or other content can be forced to be viewed in the secure mode of operation by adding a secure mode tag to the X-header for the email. Additionally, the user of the client device 10 can freely toggle between the secure mode of operation and a normal mode of operation, or the client application 120 can prevent toggling based on a compliance rule 141 or other setting.

In some examples, the secure mode of operation can be used as a plug-and-play architecture which can be used by various email classification systems. For instance, when an email classification system recognizes that an email document 15 contains potentially sensitive content, the email classification system can classify the email document 15 such that a client application 120 automatically opens the email document 15 in the secure mode of operation. Additionally, based on the sensitivity of the email document 15, the secure mode of operation 15 can automatically be triggered by the client application 120. For instance, a client application 120 can notify a recipient that a sender of an email document 15 prefers the recipient open the email in the secure mode of operation.

The secure mode of operation can also be implemented in various network-based or offline file repositories. In one example, a user may create or modify a document (or other content) in a network-based file repository and mark the document to be viewed in the secure mode of operation. Once the content is marked, the content of the document can be converted to HTML or other form. When the user downloads the document, the client device 10 can receive an HTML copy of the document having content modified based on secure view calibration settings 1006 as well as the original document. If the user has yet to calibrate the secure mode of operation, the user can be prompted to perform the calibration before the HTML document with his secure view configuration is opened. If the user attempts to edit the document, the original copy of the document can be opened in an editor view. As can be appreciated, if the creator of the document (or other individual user) marks the document for normal view, the client application 120 can open the document in the normal mode of operation.

Figure 11A:
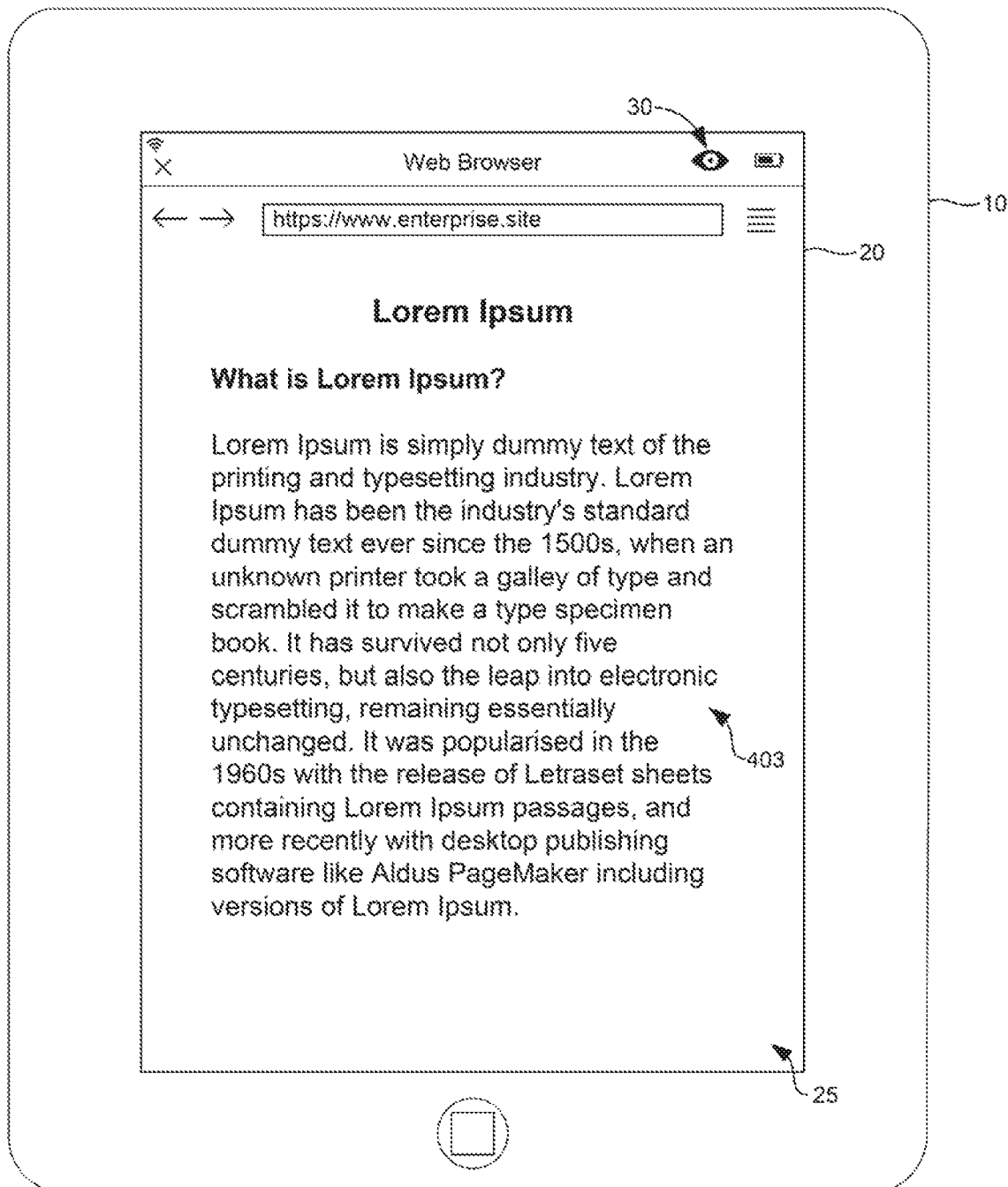
FIG. 11A is a drawing of a user interface for a web browser application having unmodified content.

Moving on to FIG. 11A, shown is an example of a user interface 25 that can be shown in a display 20 of a client device 10. The user interface 25 can be generated by a client application 120, such as a web browser application. For instance, a user can navigate the user interface 25 of a web browser application to browse various websites. When viewing a webpage, such as an HTML document, the display 20 of a client device 10 can include content 403 that can be sensitive. For instance, the webpage can include confidential information or other information that should not be available to eavesdroppers 35 in a vicinity of a client device 10. The non-limiting example of FIG. 11A shows content 403 rendered in a display 20 without modification.

Figure 11B:
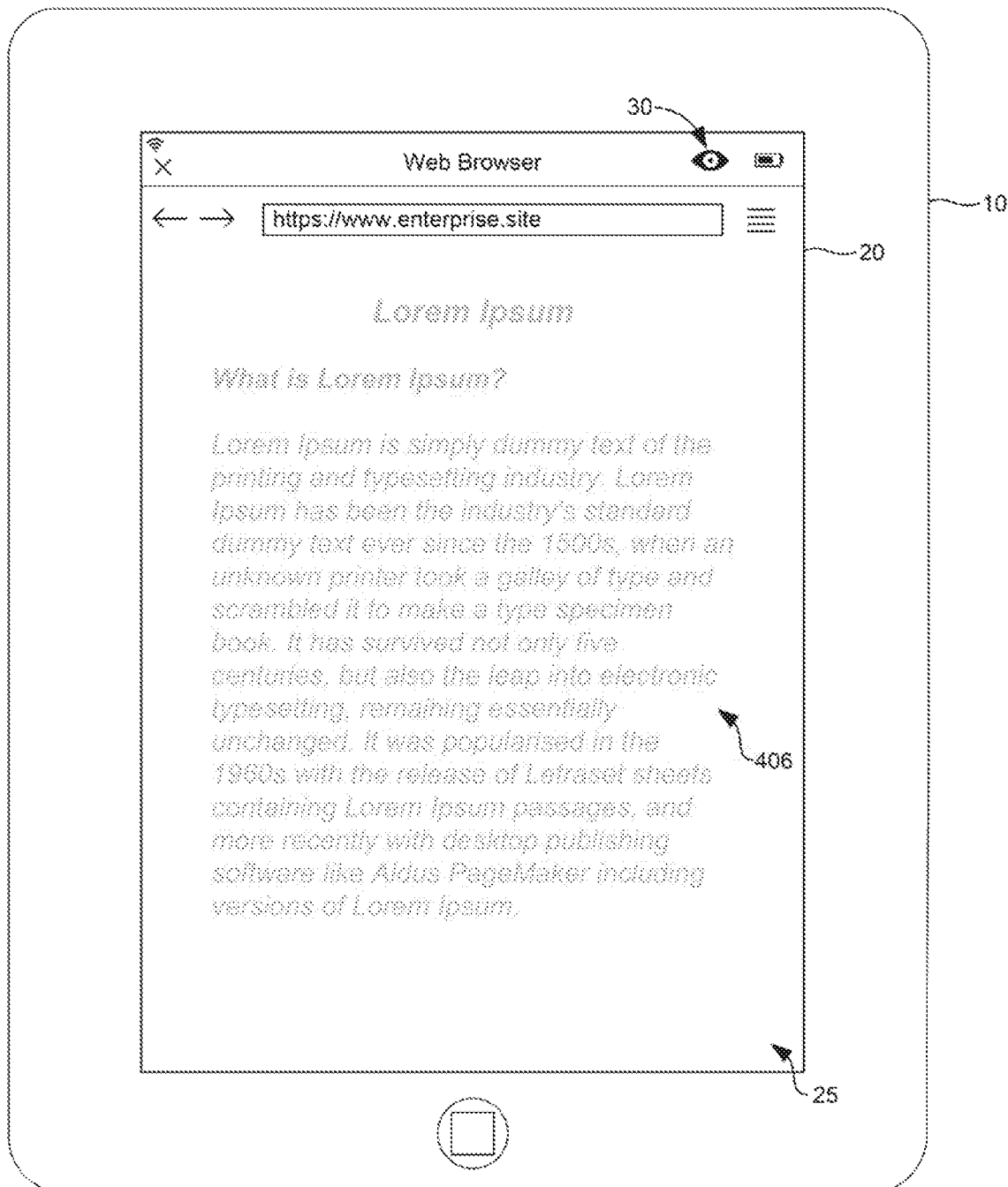
FIG. 11B is a drawing of a user interface for a web browser application having content modified to prevent unauthorized viewing by one or more eavesdroppers.

Referring now to FIG. 11B, modified content 406 (a modified version of the content 403 from FIG. 11A) can be shown in the display 20 so that only a user within an operator range can perceive the modified content 406. The user can select or otherwise manipulate the secure view icon 30 to cause the client application 120 to toggle between an original form of the content 403 (shown in FIG. 11A) and the modified content 406 shown in FIG. 11B. Those outside of the operator range may find it difficult or even impossible to perceive the content shown in the display 20.

In some examples, the secure mode of operation can automatically be entered into based on a keyword in the uniform resource locator (URL) or body of the webpage, whether a secure protocol has been applied (e.g., HTTPS), a whitelist of secure domains, as well as other information. In some examples, the user can swipe left or right to enter into a normal mode of operation shown in FIG. 11A and a secure mode of operation in FIG. 11B, respectively, although additional gestures can be used. Additionally, when a user enters a URL in the web browser application, the URL can be forwarded to an extractor module located in the computing environment 103 or on the client device 120. The extractor module can fetch a webpage from the URL and modify the content 403 to generate modified content 406. A modified version of the HTML file can be returned to the browser application and used when in the secure mode of operation.

The client devices 10 or devices comprising the computing environment 103 can include at least one processor circuit, for example, having a processor and at least one memory device, both of which are coupled to a local interface, respectively. The device can include, for example, at least one computer, a mobile device, smartphone, computing device, or like device. The local interface can include, for example, a data bus with an accompanying address/control bus or other bus structure.

Stored in the memory device are both data and several components that are executable by the processor. In particular, stored in the one or more memory devices and executable by the device processor can be the client application 120, and potentially other applications. Also stored in the memory can be a data store 112 and other data.

A number of software components are stored in the memory and executable by a processor. In this respect, the term "executable" means a program file that is in a form that can ultimately be run by the processor. Examples of executable programs can be, for example, a compiled program that can be translated into machine code in a format that can be loaded into a random access portion of one or more of the memory devices and run by the processor, code that can be expressed in a format such as object code that is capable of being loaded into a random access portion of the one or more memory devices and executed by the processor, or code that can be interpreted by another executable program to generate instructions in a random access portion of the memory devices to be executed by the processor. An executable program can be stored in any portion or component of the memory devices including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Memory can include both volatile and nonvolatile memory and data storage components. Also, a processor can represent multiple processors and/or multiple processor cores, and the one or more memory devices can represent multiple memories that operate in parallel processing circuits, respectively. Memory devices can also represent a combination of various types of storage devices, such as RAM, mass storage devices, flash memory, or hard disk storage. In such a case, a local interface can be an appropriate network that facilitates communication between any two of the multiple processors or between any processor and any of the memory devices. The local interface can include additional systems designed to coordinate this communication, including, for example, performing load balancing. The processor can be of electrical or of some other available construction.

The client devices 10 can include a display 20 upon which a user interface 25 generated by the agent application 123 or other client application 120 can be rendered. In some examples, the user interface 25 can be generated using user interface data provided by the computing environment 103. The client device 10 can also include one or more input/output devices that can include, for example, a capacitive touchscreen or other type of touch input device, fingerprint reader, or keyboard.

Although the management service 115, the content modification service 118, the agent application 123, the client application 120, and other various systems described herein can be embodied in software or code executed by general-purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include discrete logic circuits having logic gates for implementing various logic functions upon an application of one or more data signals, application specific integrated circuits (ASICs) having appropriate logic gates, field-programmable gate arrays (FPGAs), or other components.

The sequence diagram and flowcharts show an example of the functionality and operation of an implementation of portions of components described herein. If embodied in software, each block can represent a module, segment, or portion of code that can include program instructions to implement the specified logical function(s). The program instructions can be embodied in the form of source code that can include human-readable statements written in a programming language or machine code that can include numerical instructions recognizable by a suitable execution system such as a processor in a computer system or other system. The machine code can be converted from the source code. If embodied in hardware, each block can represent a circuit or a number of interconnected circuits to implement the specified logical function(s).

Although the sequence diagram flowcharts show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some examples, one or more of the blocks shown in the drawings can be skipped or omitted.

Also, any logic or application described herein that includes software or code can be embodied in any non-transitory computer-readable medium for use by or in connection with an instruction execution system such as, for example, a processor in a computer system or other system. In this sense, the logic can include, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can include any one of many physical media, such as magnetic, optical, or semiconductor media. More specific examples of a suitable computer-readable medium include solid-state drives or flash memory. Further, any logic or application described herein can be implemented and structured in a variety of ways. For example, one or more applications can be implemented as modules or components of a single application. Further, one or more applications described herein can be executed in shared or separate computing devices or a combination thereof. For example, a plurality of the applications described herein can execute in the same computing device, or in multiple computing devices.

It is emphasized that the above-described examples of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure.

What is claimed is:

1. A system, comprising:
   at least one computing device; and
   program instructions executable in the at least one computing device that, when executed by the at least one computing device, cause the at least one computing device to:
   generate a modified form of a document comprising content destined for a client device by adjusting at least one visual setting associated with a display of the content such that the content is within a predetermined color threshold of a background of the content, wherein the at least one visual setting is adjusted to make the content visible to a user of a client device within a predetermined range from a display device of the client device while impacting an ability to view the content shown on the display device from an area beyond the predetermined range, the at least one visual setting adjusted comprising at least one of a background color of the content, a color of the content, a size of the content, and a style of the content; and
   selectively provide at least one of the document without modification or the modified form of the document to the client device for display on the display device, the document or the modified version of the document selectively provided based at least in part on a mode of operation of the client device.

2. The system of claim 1, wherein:
   the content comprises at least one image; and
   the modified form of the document is generated by processing the at least one image to adjust the at least one visual setting.

3. The system of claim 2, wherein:
   the content comprises text; and
   the at least one visual setting adjusted comprises at least one of: a background color of the text, a font color of the text, a font size of the text, and a font style of the text.

4. The system of claim 3, further comprising program instructions executable in the at least one computing device that, when executed by the at least one computing device, cause the at least one computing device to generate an image of the text to replace a plain-text form of the text in the modified form of the document, wherein the image is generated based at least in part on the at least one visual setting.

5. The system of claim 3, wherein the at least one visual setting is adjusted to have the font color of the text be within a color threshold of the background color of the text.

6. The system of claim 5, wherein the color threshold is determined as a function of a size of a display of the client device using:

$$Hex(Color_{Background}) - Hex(Color_{Text}) \propto \frac{1}{Size_{Text}}.$$

7. The system of claim 3, wherein the modified form of the document is generated by adjusting hypertext markup language (HTML) code associated with at least one of: the background color of the text, the font color of the text, the font size of the text, and the font style of the text.

8. A non-transitory computer-readable medium embodying program instructions executable in a client device that, when executed by the client device, cause the client device to:
   receive a document from an email server, the document comprising content;
   generate a modified form of a document comprising content by adjusting at least one visual setting associated with a display of the content such that the content is within a predetermined color threshold of a background of the content, wherein the at least one visual setting is adjusted to make the content visible to a user of a client device within a predetermined range from a display device of the client device while impacting an ability to view the content shown on the display device from an area beyond the predetermined range, the at least one visual setting adjusted comprising at least one of a background color of the content, a color of the content, a size of the content, and a style of the content; and
   selectively provide at least one of the document without modification or the modified form of the document to the client device for display on a display device, the document or the modified version of the document selectively provided based at least in part on a mode of operation of the client device.

9. The non-transitory computer-readable medium of claim 8, wherein:
   the content comprises at least one image; and the modified form of the document is generated by processing the at least one image to adjust the at least one visual setting.

10. The non-transitory computer-readable medium of claim 9, wherein:
the content comprises text; and
the at least one visual setting adjusted comprises at least one of: a background color of the text, a font color of the text, a font size of the text, and a font style of the text.

11. The non-transitory computer-readable medium of claim 10, further comprising program instructions executable in the client device that, when executed by the client device, cause the at least one computing device to generate an image of the text to replace a plaint-text form of the text in the modified form of the document, wherein the image is generated based at least in part on the at least one visual setting.

12. The non-transitory computer-readable medium of claim 10, wherein the at least one visual setting is adjusted to have the font color of the text be within a color threshold of the background color of the text.

13. The non-transitory computer-readable medium of claim 12, wherein the color threshold is determined as a function of a size of a display of the client device using:

$$Hex(Color_{Background}) - Hex(Color_{Text}) \propto \frac{1}{Size_{Text}}.$$

14. The non-transitory computer-readable medium of claim 10, wherein the modified form of the document is generated by adjusting hypertext markup language (HTML) code associated with at least one of: the background color of the text, the font color of the text, the font size of the text, and the font style of the text.

15. A computer-implemented method, comprising:
accessing an email document from an email server destined for a client device, the email document comprising email content;
generating a modified form of the email document by adjusting at least one visual setting associated with a display of the email content such that the content is within a predetermined color threshold of a background of the content, wherein the at least one visual setting is adjusted to make the email content visible to a user of a client device within a predetermined range from a display device of the client device while impacting an ability to view the email content shown on the display device from an area beyond the predetermined range, the at least one visual setting adjusted comprising at least one of a background color of the content, a color of the content, a size of the content, and a style of the content; and
selectively providing at least one of the email document or the modified form of the email document to the client device for display on a display device, the email document or the modified version of the email document selectively provided based at least in part on a mode of operation of the client device.

16. The computer-implemented method of claim 15, wherein:
the email content comprises at least one image; and
the modified form of the email document is generated by processing the at least one image to adjust the at least one visual setting.

17. The computer-implemented method of claim 16, wherein:
the email content comprises text; and
the at least one visual setting adjusted comprises at least one of: a background color of the text, a font color of the text, a font size of the text, and a font style of the text.

18. The computer-implemented method of claim 17, further comprising program instructions executable in the client device that, when executed by the client device, cause the at least one computing device to generate an image of the text to replace a plain-text form of the text in the modified form of the document, wherein the image is generated based at least in part on the at least one visual setting.

19. The computer-implemented method of claim 17, wherein the at least one visual setting is adjusted to have the font color of the text be within a color threshold of the background color of the text.

20. The computer-implemented method of claim 17, wherein the modified form of the email document is generated by adjusting hypertext markup language (HTML) code associated with at least one of: the background color of the text, the font color of the text, the font size of the text, and the font style of the text.

* * * * *